United States Patent [19]
Lindblad

[11] 4,032,080
[45] June 28, 1977

[54] LOCKING DEVICE FOR A SAFETY BELT OF WINDING-UP TYPE INTENDED FOR VEHICLES

[76] Inventor: Stig Martin Lindblad, Urbanisation Albir 1, Cyndad de Elda, Casa 36, Alfas del Pi (Alicante), Spain

[22] Filed: July 7, 1975

[21] Appl. No.: 593,728

[30] Foreign Application Priority Data

July 8, 1974 Sweden .......................... 74089327

[52] U.S. Cl. ......................................... 242/107.4 A
[51] Int. Cl.$^2$ .................. A62B 35/00; B65H 75/48
[58] Field of Search ............. 242/107.4 A, 107.4 R, 242/107.4 B–107.4 E; 280/744–747; 297/388

[56] References Cited

UNITED STATES PATENTS

| 2,706,603 | 4/1955 | Miller | 242/107.4 A |
| 2,760,737 | 8/1956 | Barecki | 242/107.4 A |
| 3,830,444 | 8/1974 | Sargeant | 242/107.4 A |
| 3,897,913 | 8/1975 | Hall | 242/107.4 A |

Primary Examiner—Stanley N. Gilreath
Assistant Examiner—John M. Jillions

[57] ABSTRACT

The present invention relates to a locking device for a safety belt of winding-up type comprising a ratchet wheel provided to rotate when the belt is pulled out and a pawl mechanism arranged to stop the rotation of the ratchet wheel when the device is subjected to abnormal acceleration forces. The mechanism comprises a spring link which is arranged with one of its ends under spring bias to influence the pawl mechanism to be in a releasing or a locking position alternatively. A portion of the spring link opposed to said end is provided to be moved relative to the pawl mechanism in such a way that in one position the pawl mechanism is urged in a direction towards the releasing position, and in a second position in a direction towards the locking position, which movement is actuated by an inertia body sensitive to acceleration forces.

2 Claims, 3 Drawing Figures

LOCKING DEVICE FOR A SAFETY BELT OF WINDING-UP TYPE INTENDED FOR VEHICLES

The present invention relates to a locking device for a safety belt of winding-up type for vehicles with a band which against the bias of a spring can be unwound from a rotatable shaft portion, comprising a ratchet wheel or similar provided to rotate with the shaft portion and a pawl mechanism arranged for cooperation with the ratchet wheel or similar, which mechanism can be switched over between a position releasing the ratchet wheel or similar and a locking position engaging the ratchet wheel or similar in order to impede the rotation thereof, the pawl mechanism being under the bias of a helical spring, which is provided to alternatively actuate the pawl mechanism with a force counteracting engagement with the ratchet wheel or similar in releasing position, and to influence the pawl mechanism with a force working to produce an engagement with the ratchet wheel or similar in the locking position, and an acceleration sensing inertia body arranged to influence the pawl mechanism to occupy the releasing position, when the inertia body is in a normal position and to influence the pawl mechanism to occupy the locking position activated by acceleration forces.

It is an object of the present invention to provide a locking device capable of sensing acceleration forces, in which a locking member e.g. a pawl can quickly occupy two distinct positions for locking and unlocking respectively, whereby a very reliable functioning device is obtained, which in an extremely high degree is sensitive to acceleration forces. An additional advantage is low manufacturing cost.

The object of the invention is realized by a device in which the helical spring is arranged with one of its ends under spring bias to influence the pawl mechanism, while a portion of the helical spring opposed to said end is provided to be moved by means of a part moveable relative to the pawl mechanism in such a way that in one position of said part the pawl mechanism is urged in a direction towards the releasing position, and in a second position of said part in a direction towards the locking position, the part being arranged to be moved between its two positions actuated by the inertia body in its normal and activated positions respectively.

The invention is described in the following in an embodiment with reference to the accompanying drawings in which FIG. 1 shows a partly broken view of a locking device according to the invention;

Figure 2:
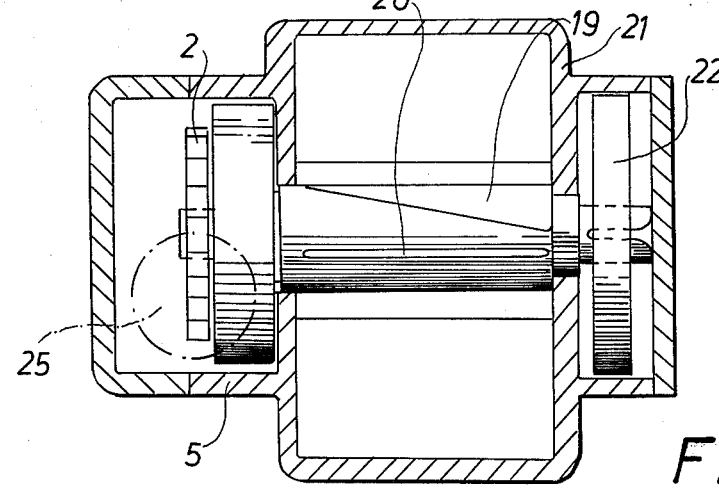
FIG. 2 shows a cross sectional view along the line II—II in FIG. 1.
Figure 3:
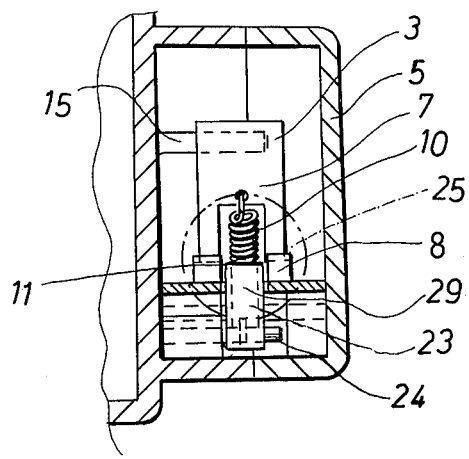
FIG. 3 shows a cross sectional view along the line III—III of FIG. 1.

The device according to the invention and illustrated in the drawings forms a part of a locking device 1 of a safety belt of winding-up type intended for vehicles. As shown in FIG. 2 the safety belt device comprises a shaft 19 with a slot 20 by means of which a band (not shown) forming the belt can be attached to the shaft 19. The shaft 19 is arranged to rotate in a housing 21 in which a watch spring 22 is provided to rotate the shaft 19 in one direction. In the other direction the shaft 19 can be rotated by pulling out said band, which consequently if released will be drawn back into the housing 21 and wound up on the shaft 19 by means of the spring 22. This arrangement is common for safety belts of the present type. When the safety belt is used to protect a person the band is drawn out of the safety belt device and attached over the body of the person. During normal circumstances the band is free to pull out thereby allowing the person to lean forwards. If a collision should occur however, the shaft 19 has to be locked so that the band prevents the person from being thrown away from the seat of the vehicle by forces of acceleration. The locking mechanism according to the invention is arranged to provide such a locking of the shaft.

The locking mechanism comprises a ratchet wheel 2, which is attached to the shaft 19, said wheel at its periphery being provided with teeth 16, between which a pawl 3 can be introduced in order to impede the rotation movement of the wheel 2, and consequently also the shaft 19.

A rocker arm 7 comprises preferably a two-leg gable shaped piece of sheet metal, the legs of which are supported in a bearing support 8 of a supporting plate 9 provided in the housing 21. The bearing support 8 forms a pivoting axis for the arm 7. A tension spring 10 is positioned between the two gable legs of the arm 7, said spring having its upper end attached to the rocket arm 7, its lower end being immobile and attached to a shaft 24. A two armed lever arm 23, extends through an opening 17 of the supporting plate 9 and is journalled on the shaft 24.

The device further includes an inertia sensing body in the form of a ball 25, which rests in a cup 26 with a central hole 27.

The arm 23 rests against the underside of the ball 25 with an actuation end portion 28, which extends through the hole 27. The other end portion of the lever 23 acts as a sensing portion 29 located on the opposite side of the bearing relative to the actuation portion 28 and bears against an intermediate portion 4 of the spring 10, when the actuation portion 28 is kept down by the ball 25.

Figure 1:
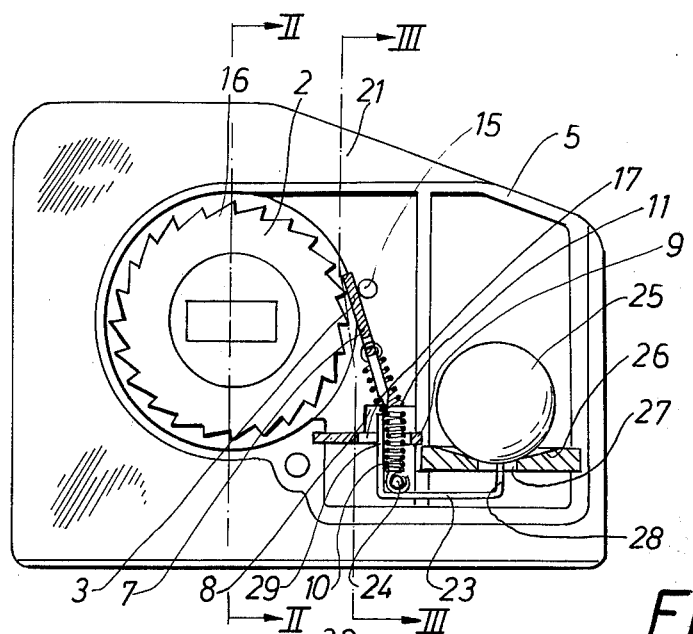

In the normal position illustrated in FIG. 1 the spring 10 which in this position of the end portion 29 is bent to the right past the bearing support 8 for the arm 7, has such actuation upon the arm 7 that said arm is biased to rest against the stop pin 15, i.e. the same is in a releasing position.

If on account of abnormal forces of acceleration affecting the vehicle the ball should roll in upwards direction from the inclining bottom of the cup 26, the end portion 28 of the arm 23 is left free.

This means that the spring 10 is given the possibility to straighten out and it will move to a position with its longitudinal centerline positioned to the left of the bearing support 8. The arm 7 is thereby actuated by a torque in counter clockwise direction and the pawl 3 will switch over to a locking position engaging the ratchet wheel 2.

It may be mentioned that if the mechanism is suitable thereto, a compression spring can be used instead of the tension spring used in the embodiment shown.

I claim:

1. Locking device for a safety belt of the winding-up type for vehicles having a rotatable shaft, means for attaching the safety belt to the shaft, and a spring biased said shaft to rotate in one direction, against which bias said belt can be unwound, said device comprising a ratchet wheel connected to said shaft to rotate therewith, pawl means pivotable around a pivoting axis between a releasing position disengaged from the ratchet wheel and a locking position engaging the ratchet wheel in order to impede the rotation thereof, said pawl means including a pivotable member and spring means having one end connected to said pivotable member at a distance from said pivoting axis to bias same, a fixed support, the other end of said spring means carried by said fixed support, a movable element having an actuating portion operably associated with an intermediate portion of said spring means adapted to displace said intermediate portion of said spring means, giving same a different bending condition, and an acceleration sensing inertia body movable between a resting position and an activated position, said activated position being taken under the influence of acceleration forces exceeding a predetemined value, said movable element having a sensing portion sensing the position of said inertia body, said inertia body in one of its positions biasing the movable element via its sensing portion to a first position, said spring means by means of its intermediate portion biasing said movable element via its actuating portion to a second position, and said intermediate portion of the spring means being moved between a first and a second position, corresponding to the two positions of the inertia body, whereby the motion between the two positions of the intermediate portion of said spring means results in that the direction of the spring means bias force acting on said pivotable member of the pawl means passes from one side to the other side of said pivoting axis, thereby changing the direction of the torque acting on said pivotable member, to bias the pawl means to move alternatively into said releasing and into said locking position.

2. Locking device according to claim 1, wherein in the releasing position of the pawl means the movable element is biased to its first position by the weight of the inertia body in its resting position against the bias of the spring means, and in the locking position of the pawl means the weight of the inertia body is removed by movement of the inertia body to its activated position and the movable element is moved to its second position by the bias of the spring means.

* * * * *